United States Patent
Baumgartner et al.

(10) Patent No.: US 9,403,429 B2
(45) Date of Patent: Aug. 2, 2016

(54) MOTORIZED HUB INCLUDING COUPLING AND UNCOUPLING MEANS

(75) Inventors: Gérard Baumgartner, Mezieres (CH); Daniel Walser, Cormerod (CH)

(73) Assignees: COMPAGNIE GENERALE DES ETABLISSEMENTS MICHELIN, Clermont-Ferrand (FR); Michelin Recherche et Technique S.A., Granges-Paccot (CH); RENAULT S.A.S., Boulogne-Billancourt (FR)

( * ) Notice: Subject to any disclaimer, the term of this patent is extended or adjusted under 35 U.S.C. 154(b) by 393 days.

(21) Appl. No.: 13/516,988

(22) PCT Filed: Dec. 16, 2010

(86) PCT No.: PCT/EP2010/069895
§ 371 (c)(1),
(2), (4) Date: Aug. 24, 2012

(87) PCT Pub. No.: WO2011/073320
PCT Pub. Date: Jun. 23, 2011

(65) Prior Publication Data
US 2012/0312608 A1    Dec. 13, 2012

(30) Foreign Application Priority Data

Dec. 16, 2009 (FR) ...................................... 09 59072

(51) Int. Cl.
*B60K 7/00*      (2006.01)
*B60K 1/00*      (2006.01)
*B60K 17/04*     (2006.01)

(52) U.S. Cl.
CPC ............. *B60K 7/0007* (2013.01); *B60K 17/043* (2013.01); *B60K 2007/0038* (2013.01); *B60K 2007/0061* (2013.01); *B60L 2220/46* (2013.01)

(58) Field of Classification Search
CPC ................................ B60K 7/00; B60K 7/0007
USPC ............................................... 180/65.51, 65.6
See application file for complete search history.

(56) References Cited

U.S. PATENT DOCUMENTS 3,672,310 A * 6/1972 Gooch ......................... 105/96.2
4,553,623 A * 11/1985 Ohkubo ....................... 180/247

(Continued)

FOREIGN PATENT DOCUMENTS

DE            103 38 659        3/2005

*Primary Examiner* — Joseph Rocca
*Assistant Examiner* — Travis Coolman
(74) *Attorney, Agent, or Firm* — Cozen O'Connor

(57) ABSTRACT

A motorized hub for electric powering of an axle of a hybrid drive automotive vehicle, said motorized hub comprising a hub designed to receive a wheel, the hub being mounted rotationally relative to a hub carrier about a hub axis, the motorized hub comprising an electric drive motor, the electric motor comprising an external stator connected to the hub carrier and an internal rotor whose axis of rotation is remote from the hub axis, the motorized hub comprising reduction means acting between the rotor of the electric motor and the hub, the motorized hub comprising coupling/uncoupling means capable of adopting a coupling position in which rotation of the electric motor is coupled to the rotation of the hub and an uncoupling position in which rotation of the electric motor is uncoupled from the rotation of the hub, the motorized hub being characterized in that the coupling/decoupling means are arranged between the reduction means and the hub.

13 Claims, 4 Drawing Sheets

(56) References Cited

U.S. PATENT DOCUMENTS

| | | | |
|---|---|---|---|
| 4,763,538 A * | 8/1988 | Fujita et al. | 74/6 |
| 4,880,070 A * | 11/1989 | Irikura | 180/53.1 |
| 6,079,539 A * | 6/2000 | Fetcho et al. | 192/85.53 |
| 6,257,604 B1 * | 7/2001 | Laurent et al. | 280/124.127 |
| 6,321,863 B1 * | 11/2001 | Vanjani | 180/65.51 |
| 7,255,188 B2 * | 8/2007 | Tsukada et al. | 180/65.51 |
| 7,350,606 B2 * | 4/2008 | Brill et al. | 180/65.51 |
| 7,353,895 B2 * | 4/2008 | Bitsche et al. | 180/65.25 |
| 7,401,794 B2 * | 7/2008 | Laurent et al. | 280/5.514 |
| 7,686,145 B2 * | 3/2010 | Akagi et al. | 192/13 R |
| 7,703,565 B2 * | 4/2010 | Ikenoya et al. | 180/65.51 |
| 7,735,589 B2 * | 6/2010 | Sugiyama | 180/65.51 |
| 7,841,436 B2 * | 11/2010 | Bussinger | 180/214 |
| 7,975,789 B2 * | 7/2011 | Murata | 180/65.51 |
| 8,020,653 B2 * | 9/2011 | Mizutani et al. | 180/65.51 |
| 8,037,957 B2 * | 10/2011 | Laurent | 180/65.51 |
| 8,167,061 B2 * | 5/2012 | Scheuerman et al. | 180/65.1 |
| 8,360,188 B2 * | 1/2013 | Yonehana et al. | 180/220 |
| 8,490,729 B2 * | 7/2013 | Walser et al. | 180/65.51 |
| 2008/0223638 A1 * | 9/2008 | Niwa | 180/65.5 |

* cited by examiner

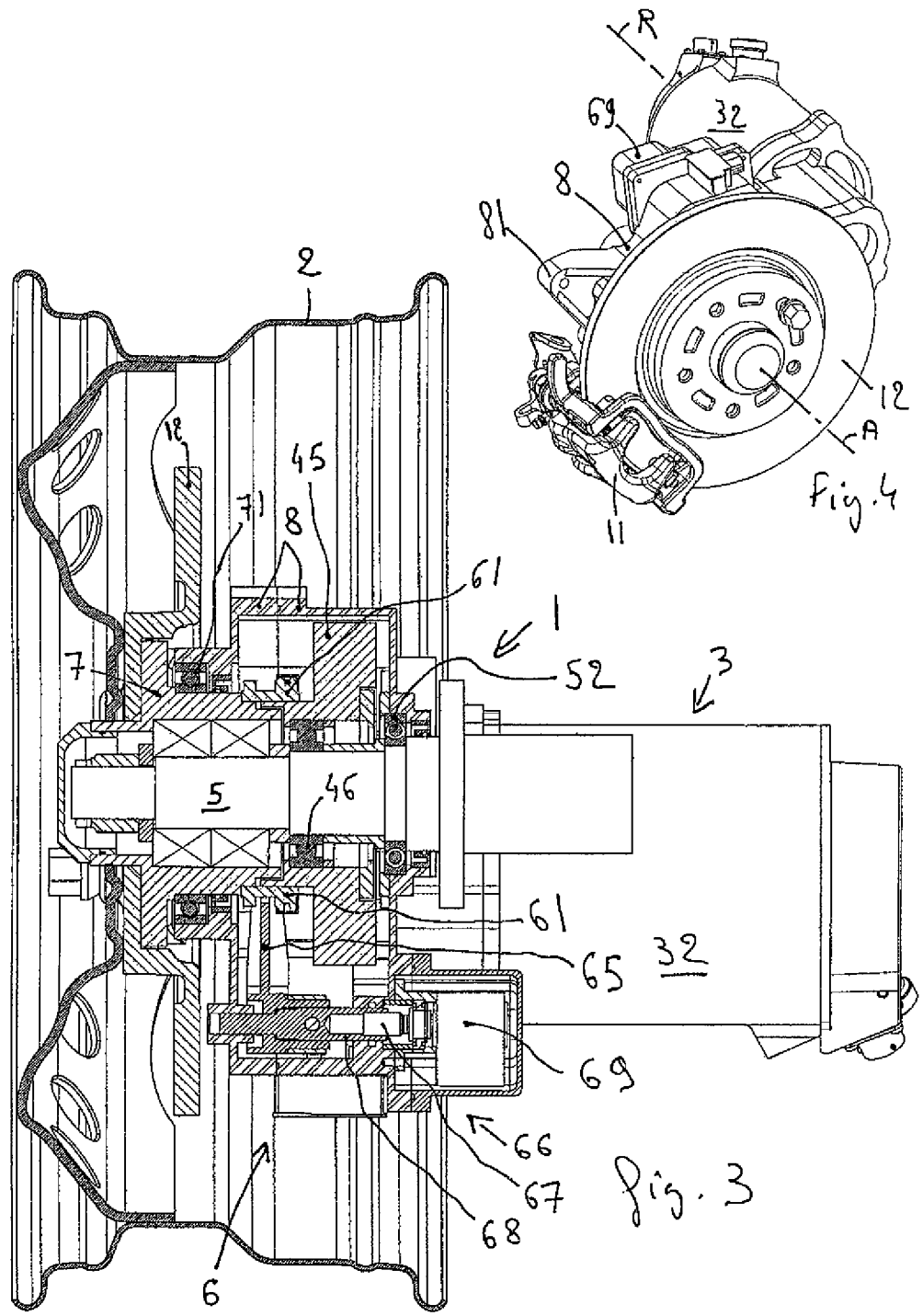

MOTORIZED HUB INCLUDING COUPLING AND UNCOUPLING MEANS

RELATED APPLICATIONS

This is a U.S. National Phase Application under 35 USC 371 of International Application PCT/EP2010/069895 filed on Dec. 16, 2010.

This application claims the priority of French Application No. 09/59072 filed Dec. 16, 2009, the entire content of which is hereby incorporated by reference.

FIELD OF THE INVENTION

The present invention relates to the ground contact system of electrically driven automotive vehicles, in particular their motorized wheels.

BACKGROUND OF THE INVENTION

A certain number of proposals are known in this field, such as those in documents EP 0878332, EP 1630026, WO 2006/032669, US 2007/0257570, WO 2007/083209 or WO 2009/124892.

In the present application, the expression "motorized hub" is used to denote the mechanical assembly comprising the hub, the hub carrier, steering of the hub relative to the hub carrier, the electric power system and the hub braking means. The motorized hub is therefore intended on the one hand to receive a wheel equipped for example with a tire and on the other hand to carry a vehicle, generally through the intermediary of suspension means. In the present application, the expression "motorized wheel" is likewise used to denote the mechanical assembly comprising the motorized hub defined above and the corresponding wheel.

One of the difficulties in adopting such motorized hubs for mass-produced vehicles is compatibility with the solutions already adopted and approved by the constructors for certain elements such as suspension systems and wheels. Another difficulty is that of achieving a simple, compact system which is as light as possible, so as to make the cost acceptable to said industry.

In particular, the incorporation of electric motors inside wheels is particularly desirable because the adoption of electric drive systems frequently involves the need for on-board batteries for storing electrical energy which, even with the highest-performance technologies known to date, requires a sufficient volume to be dedicated to the batteries on board the vehicle, the autonomy of the electric vehicle otherwise being highly reduced. A similar reasoning can be made in the case of fuel cell or hybrid parallel vehicles.

Furthermore, if it is wished to be able to develop sufficient drive torque, it is necessary to install reduction means, because it is not possible, with a sufficiently compact electric motor, to develop sufficient torque to directly ensure drive of a passenger vehicle.

Furthermore, parallel hybrid vehicles whose internal combustion engine generally allows travel at relatively high speeds (for example 150 km/h) constitute a particular problem in terms of choice of electric drive reduction ratio.

Finally, it is generally necessary to incorporate in the wheel not only the electric motor, and the associated necessary reduction means, but also a mechanical braking device (disk brake or friction drum).

SUMMARY OF THE INVENTION

One object of the invention is therefore to solve all or some of these problems.

One aspect of the invention is directed to a motorized hub for electric powering of an axle of a hybrid drive automotive vehicle, said motorized hub comprising a hub designed to receive a wheel, the hub being mounted rotationally relative to a hub carrier about a hub axis, the motorized hub comprising an electric drive motor, the electric motor comprising an external stator connected to the hub carrier and an internal rotor whose axis of rotation is remote from the hub axis, the motorized hub comprising reduction means acting between the rotor of the electric motor and the hub, the motorized hub comprising coupling/uncoupling means capable of adopting a coupling position in which rotation of the electric motor is coupled to the rotation of the hub and an uncoupling position in which the rotation of the electric motor is uncoupled from the rotation of the hub, the motorized hub being characterized in that the coupling/uncoupling means are arranged between the reduction means and the hub.

Preferably, the coupling/uncoupling means comprise a dog clutch and sliding member mechanism, the sliding member being coaxial with the hub.

Preferably, the reduction means comprise a drive pinion designed to be connected to the shaft of the electric motor and a toothed ring designed to be connected to the hub.

Preferably, the reduction means comprise two reduction stages.

Also preferably, a first reduction stage consists of meshing of the drive pinion and a toothed wheel connected to an intermediate shaft, a second reduction stage consisting of meshing of a reduction pinion connected to the intermediate shaft and of the toothed ring designed to be connected to the hub.

Also preferably, the intermediate shaft is parallel to the hub axis.

Preferably, the hub carrier is a stub axle around which the hub turns.

Preferably, a casing contains the reduction means and the coupling/uncoupling means and carries the electric motor, said casing being mounted rotationally relative to the hub carrier, this rotation taking place about the hub axis.

According to a first preferred variant, the sliding member is constantly connected for rotation with the reduction means, the sliding member comprising internal cylindrical grooves, the grooves of the sliding member being capable of engaging, in the coupling position, with external grooves on the hub.

According to a second variant, the sliding member comprises frontal toothing capable of interacting, in the coupling position, with frontal toothing integral with the hub ring.

Preferably, the motorized hub further comprises a disk brake, the brake disk being positioned outside the casing relative to the vehicle.

Another aspect of the invention is directed to a motorized wheel comprising a motorized hub as described above.

Another aspect of the invention is directed to a vehicle comprising two such motorized wheels.

Preferably, the two motorized wheels are arranged on the rear axle of said vehicle, the hub carriers of two motorized wheels each being firmly connected with a trailing arm of the rear axle.

Also preferably, a connecting rod (101) controls rotation of each of the two casings relative to each of the hub carriers.

BRIEF DESCRIPTION OF THE DRAWINGS

Other features and advantages of the invention will become apparent from a description of preferred embodiments. In the respective figures:

FIG. 3 is a sectional view of this embodiment along the straight line C-C visible in FIG. 1.

FIG. 4 is an overall, perspective view of the motorized hub of the preceding figures.

DETAILED DESCRIPTION OF THE DRAWINGS

Figure 1:
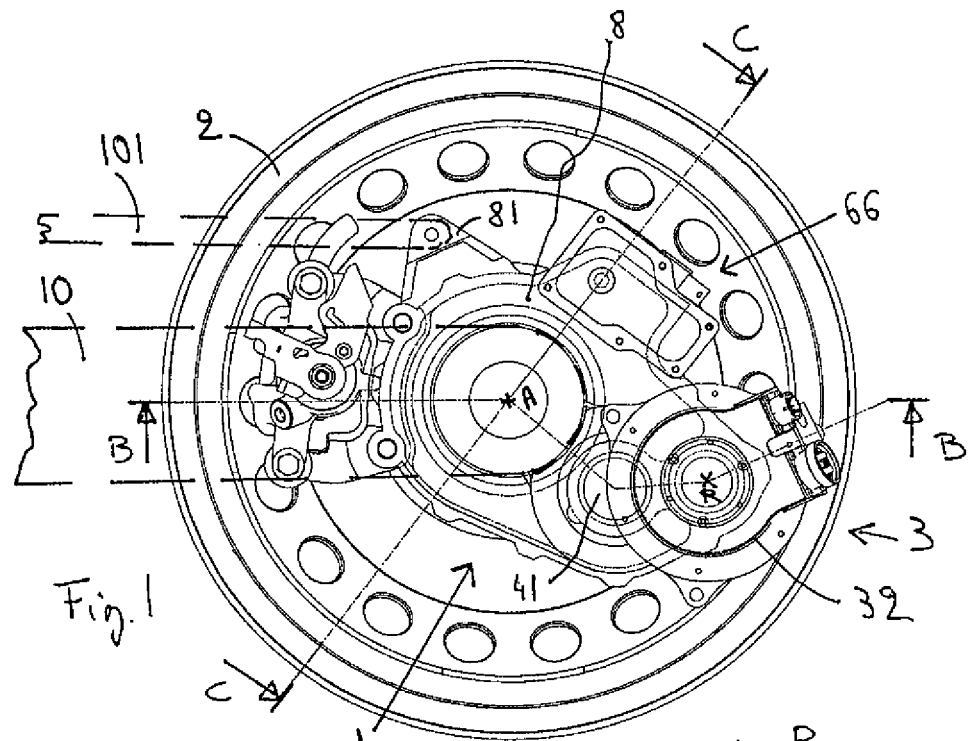
FIG. 1 is a plan view in the hub axis of a first embodiment of the motorized hub according to an embodiment of the invention.
Figure 2:
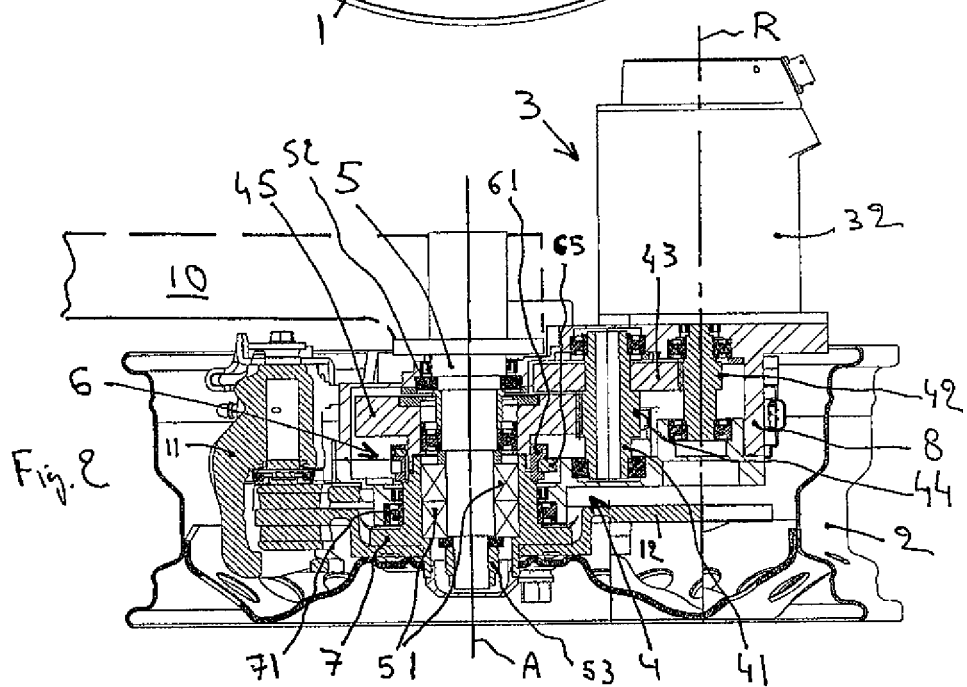
FIG. 2 is a sectional view of this embodiment along the broken line B-B visible in FIG. 1.

Throughout the figures, identical or similar elements bear the same reference numerals. Description thereof is thus not systematically repeated.

FIGS. 1 to 4 show a first embodiment of a motorized wheel according to the invention. The motorized hub 1 is intended to steer and control rotation of a wheel 2. The tire has been omitted in the figures. A hub 7, designed to receive the wheel 2, is mounted to revolve relative to a hub carrier 5 about a hub axis A by means of hub bearings 51.

The hub axis A is a constant point of reference in the present application, with orientations qualified as "radial" or "axial" referring to this axis. By way of reminder and in accordance with established use in the field of tires or wheels, an axial orientation is an orientation parallel to the hub axis and a radial orientation is an orientation perpendicular to the hub axis.

An electric motor 3 powers and if applicable brakes the hub by means of reduction means 4. To simplify the drawing of the electric motor, only the outer sleeve of the stator 32 and the ends thereof are shown.

The reduction means 4 preferably comprise two reduction stages. The drive pinion 42 is driven by the shaft of the rotor (not shown). The drive pinion 42 meshes with an intermediate wheel 43 of an intermediate shaft 41. The intermediate shaft 41 comprises an intermediate pinion 44 meshing with a hub ring 45. The overall reduction ratio is preferably greater than 15.

An essential feature of the motorized hub according to the invention is that it comprises coupling/uncoupling means 6 enabling the establishment or interruption of torque transmission between the reduction means 4 and the hub 7. In the example in FIGS. 1 to 4, these coupling/uncoupling means take the form of a system of dog clutching by axial sliding member 61. In a manner known per se, the sliding member comprises internal grooves capable of cooperating with corresponding external grooves on the ring 45 and the hub 7. This type of dog clutching may be described as "cylindrical dog clutching".

A fork 65 controls the axial position of the sliding member 61 between a coupling position and an uncoupling position. In the coupling position shown here, the sliding member sits astride the two elements and transmits the torque between the toothed ring 45 and the hub 7. This transmission is interrupted in the uncoupling position. Preferably, in the uncoupling position, the sliding member remains firmly connected with the reduction means, as is the case in the embodiment represented here. In this way, when the vehicle travels in the uncoupled mode and the electric motor is stopped, the hub is the sole moving element, the reduction means and the sliding member being immobile.

The fork 65 which controls the sliding member may be controlled by an actuator 66 with screw 67 and nut 68, comprising a small electric gear motor 69. An electromagnet may also ensure this control.

Figure 5:
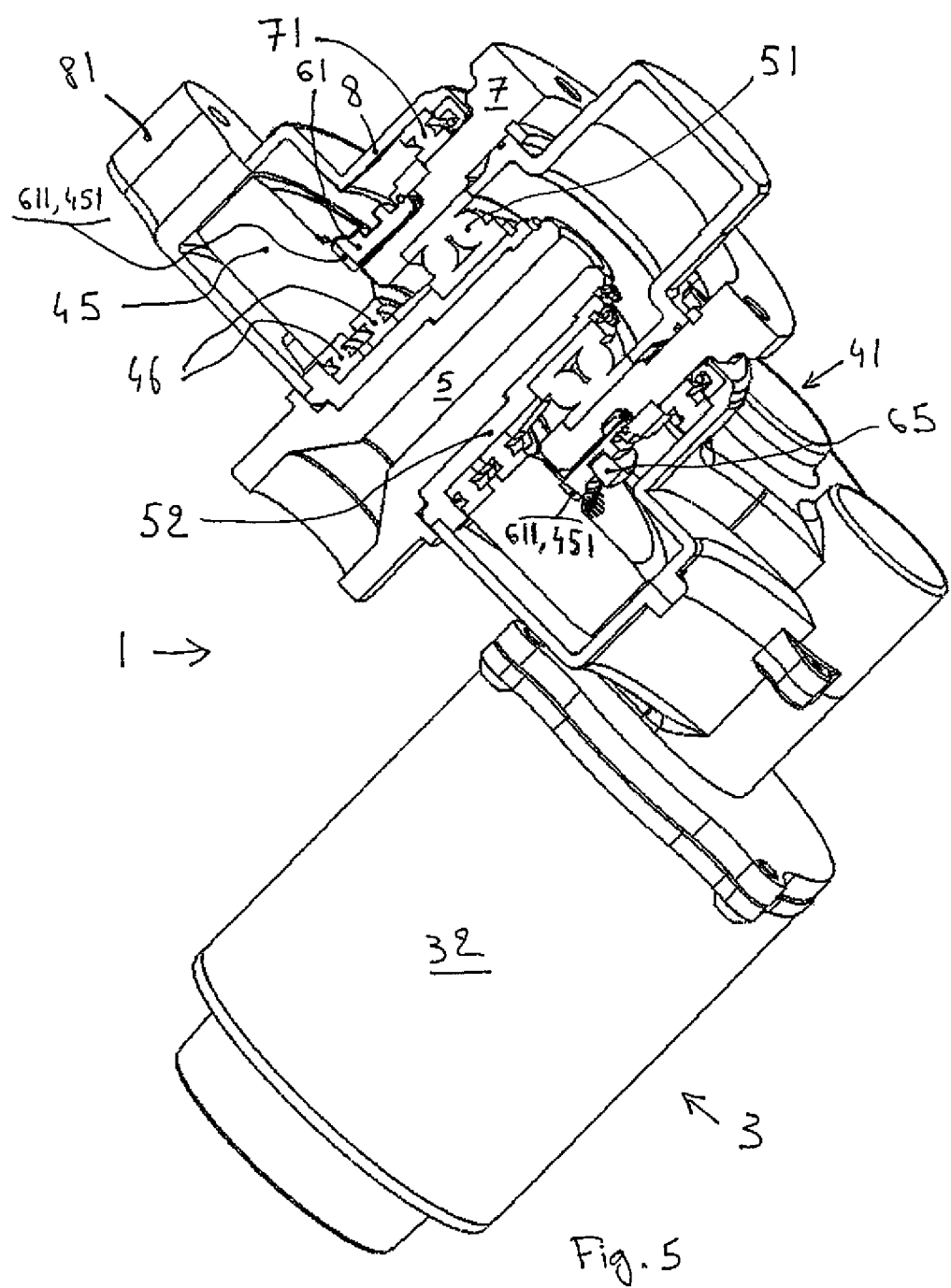
FIG. 5 is a sectional and perspective view of a second embodiment of the invention.
Figure 6:
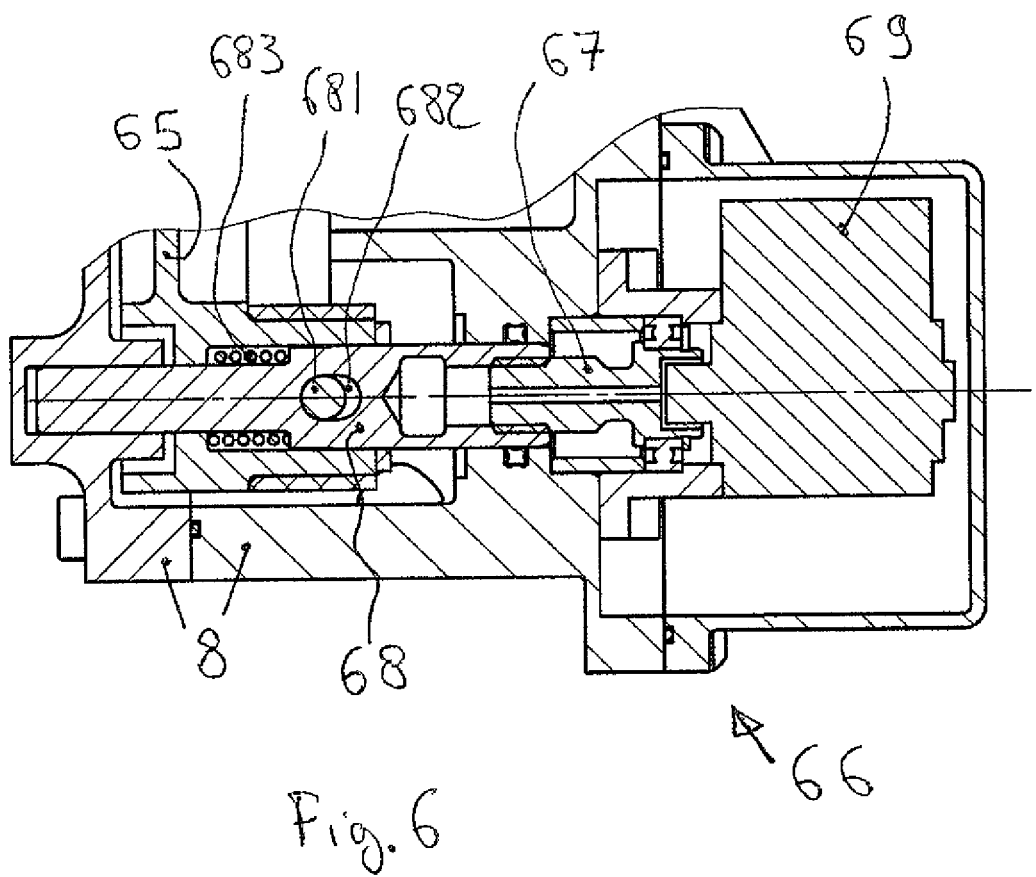
FIG. 6 is a sectional view of a preferred detail of embodiment of the invention.

FIG. 6 shows a preferred embodiment of this control by electrical actuator 66. Beyond the principle described above and illustrated in FIG. 3, it can be seen here that an oblong hole 682 allows axial movement of the pin 681 which connects the fork 65 to the nut 68 of the actuator. The position of the fork 65 relative to the nut 68 is pretensioned by a spring 683 which tends to push the fork towards the left of the figure and the nut towards the right. Thus, when the nut tends to move the fork towards the right of the figure, the nut/fork connection is rigid. Conversely, the connection is resilient (beyond the pretensioning force exerted by the spring) when the fork is subjected to axial force by the sliding member which tends to move the fork towards the right more rapidly than the movement imparted to the nut by the gear motor. For example, in the event of uncoupling during which a significant torque (drive or braking) remains, the sliding member may be pushed axially when the chamfers of the teeth of the dog clutch come to rest against the chamfers of the teeth of the sliding member. This virtually instantaneous displacement could cause irreversible damage to the coupling/uncoupling means, such as for example permanent deformation of the fork, if the degree of freedom which has just been described did not protect them therefrom. This preferred mounting of the actuator 66 described here in the context of the first embodiment is also of relevance in the context of the second embodiment described below with reference to FIG. 5.

The entire transmission, that is to say all the reduction and coupling/uncoupling functions, is accommodated in a casing 8. The casing 8 may additionally contain a sufficient quantity of a lubricant for splash lubrication of the assembly.

The axis of rotation R of the rotor of the electric motor is remote from the hub axis A and preferably parallel thereto. The stator 32 of the electric motor is connected for rotation to the hub carrier 5. This connection, necessary for torque transmission, may be rigid and direct but it may preferably be indirect so as to enable, as shown here, a relative rotational movement in the event of suspension deflection. This relative movement is of course limited and is intended to allow a degree of independence between the transmitted torque and the dynamic rigidity (vertical and horizontal) of the suspension device. In this case, the stator 32 is therefore firmly connected to the casing 8, while the casing may itself pivot relative to the hub carrier 5 and to the hub 7 by means of bearings 52 and 71 respectively. Rotation of the casing relative to the hub carrier is controlled by a connecting rod 101 (see FIG. 1) acting between the casing (fixing device 81) and the vehicle body (not shown).

The hub carrier 5 preferably takes the form of a stub axle, on which the hub bearings 51 are axially clamped by a nut 53 at the outer end thereof. The inner part of the hub bearings is thus stationary (firmly connected with the stub axle 5) and the outer part turns with the hub 7.

The hub carrier 5 may be fixed to the end of a trailing arm 10 of an axle, for example a twistable rear axle of a hybrid vehicle whose front wheels are powered by an internal combustion engine. As can be seen in FIG. 1, the connecting rod 101 and the trailing arm 10 then cooperate to enable transmission of a torque to the wheel and also to control rotation of the casing 8 as a function of suspension deflection. Depending on the precise lengths and orientations of the arm and of the connecting rod, it will be understood that it is possible, for example, to achieve effects tending to load or unload the suspension in the event of braking or acceleration but also variation of the ground clearance of the engine or a reduction in the space occupied by the stator 32 inside the volume of the vehicle body at the end of a stroke.

FIG. 4 is a perspective view of the motorized hub 1 of the previous figures, shown this time without a wheel, as viewed from the outside of the vehicle. The figure clearly reveals the conventional braking system (calipers 11 and disk 12), the casing 8, the stator 32 of the electric motor as well as the control motor 69 for the coupling/uncoupling means.

FIG. 5 shows a second embodiment of a motorized hub according to the invention. An essential difference from the first embodiment lies in the fact that the coupling/uncoupling means use dog clutching which could be described as "frontal dog clutching". Coupling of the reduction means to the hub here proceeds by means of complementary toothing 611, 451 cut respectively at the end of the sliding member 61 and on the sidewall of the toothed ring 45. The sliding member is thus pushed against the ring to adopt the coupling position. The sliding member is connected for rotation to the hub by means of complementary cylindrical grooves, in a similar way to the first preferred embodiment. However, unlike the first preferred embodiment, this rotational connection is always maintained, including in the uncoupling position. The sliding member remains connected for rotation with the hub, that is to say that it is driven in rotation as soon as the vehicle moves, including as a result of a force other than a drive force from the electric motor, such as for example in the case of a hybrid vehicle moved by its internal combustion engine.

As in the first preferred embodiment, the motorized hub according to this second embodiment is preferably mounted for rotation relative to the vehicle's suspension elements, for example on a trailing arm of a rear axle. To do this, a bushing 52 is here mounted slidingly on the stub axle 50 and carries the casing 8 together with all the other parts such as the bearings of the hub 51 and ring 46. In this way, the entire motorized hub may be easily mounted on or removed from the stub axle. A connecting rod (not shown in FIG. 5) anchored on its fixing device 81 may control the angular position of the casing (and therefore of the electric motor) in a similar way to that described above for the first preferred embodiment.

An advantageous way of constructing a hybrid vehicle is to combine conventional combustion engine powering of the front axle with electric powering of the wheels of the rear axle according to the invention. The source of electric power may be an array of batteries or supercapacitors, a fuel cell, an urban network of the trolleybus type or any other available electrical power source.

The various figures show a single electric motor. It is of course possible, according to the invention, to employ two or more motors for each hub, the motors each meshing via their own drive pinions with common reduction means. A plurality of motors makes it possible to increase the torque available and/or reduce the axial and radial dimensions of the electric motors.

Likewise, a disk brake has systematically been shown. This is indeed a preferred embodiment but a person skilled in the art will know that in certain situations it may be preferable to use a drum brake instead of the disk brake.

However the invention is embodied, the reduction means are preferably reversible so as to allow use of the electric motor in braking mode. The electrical energy recovered by the electric motor in braking mode may be stored or dissipated in a manner known per se.

An essential feature of the motorized hubs of the invention is the selection of an electric motor with internal rotor whose axis of rotation is remote from the hub axis and parallel to said hub axis, that is to say not concentric.

A motorized hub according to the invention therefore allows coupling/uncoupling of the electric power system at any point, including during movement of the vehicle. To allow smooth uncoupling, it is preferable to control the electric motor such that it transmits zero or very low torque at the time of movement of the sliding member. For coupling operation, the signal from the ABS sensor of the corresponding wheel is preferably used to control the electric motor in such a way that the ring adopts a speed of rotation identical or similar to that of the hub. It is then simultaneously possible to cause movement of the sliding member towards its coupling position and to compel the electric motor not to resist (zero torque) slight acceleration or deceleration during this dog clutching movement to allow synchronization.

Although the present description concentrates on two specific embodiments, a person skilled in the art will be able to envisage other combinations of the various means described herein or other combinations of some of these means with other means not described herein but known from the prior art.

The invention claimed is:

1. A motorized hub for electric powering of an axle of a hybrid drive automotive vehicle, said motorized hub comprising:
    a hub configured to receive a wheel, the hub being mounted rotationally relative to a hub carrier about a hub axis,
    an electric drive motor:
        an external stator connected to the hub carrier; and
        an internal rotor whose axis of rotation is remote from the hub axis;
    reduction means acting between the rotor of the electric drive motor and the hub, said reduction means comprise a drive pinion configured to be connected to a shaft of the electric drive motor and a toothed ring configured to be connected to the hub; and
    coupling/uncoupling means comprises a dog clutch and sliding member mechanism, the sliding member mechanism being coaxial with the hub, the coupling/uncoupling means arranged between the reduction means and the hub and configured to adopt a coupling position in which rotation of the electric drive motor is coupled to the rotation of the hub and an uncoupling position in which rotation of the electric drive motor is uncoupled from the rotation of the hub and constantly connected for rotation with the hub, one end of said sliding member mechanism comprising frontal toothing configured to interact, in the coupling position, with complementary toothing cut on a sidewall of the toothed ring.

2. A motorized wheel comprising the motorized hub as claimed in claim 1.

3. A vehicle comprising at least two motorized wheels as claimed in claim 2.

4. The vehicle as claimed in claim 3, wherein two motorized wheels are arranged on a rear axle of said vehicle, the hub carriers of two motorized wheels each being firmly connected with a trailing arm of the rear axle.

5. The vehicle as claimed in claim 4, wherein a connecting rod controls rotation of each of two casings relative to each of the hub carriers, said connecting rod and said trailing arm cooperate to enable transmission of a torque to each of the two wheels and to control rotation of each of the two casings as a function of suspension deflection.

6. The motorized hub as claimed in claim 1, wherein the reduction means comprise two reduction stages.

7. The motorized hub as claimed in claim 6, wherein a first reduction stage consists of meshing of the drive pinion and a toothed wheel connected to an intermediate shaft, a second reduction stage consisting of meshing of a reduction pinion connected to the intermediate shaft and the toothed ring designed to be connected to the hub.

8. The motorized hub as claimed in claim 7, wherein the intermediate shaft is parallel to the hub axis.

9. The motorized hub as claimed in claim 1, wherein a casing contains the reduction means and the coupling/uncoupling means and carries the electric motor, said casing being mounted rotationally relative to the hub carrier, said rotation taking place about the hub axis.

10. The motorized hub as claimed in claim 9, further comprising a disk brake, the brake disk being positioned outside the casing relative to the vehicle.

11. The motorized hub according to claim 1, further comprising a fork configured to control an axial position of the sliding member between the coupling position and the uncoupling position and an electrical actuator having a screw, a nut, and an electric gear motor and adapted to control said fork.

12. The motorized hub according to claim 11, wherein the nut of the actuator comprises an oblong hole configured to cooperate with a pin connecting the fork to the nut of the actuator, a position of the fork relative to the nut being pretensioned by a spring which tends to push the fork away from the nut.

13. The motorized hub as claimed in claim 1, wherein the hub carrier is a stub axle around which the hub turns.

* * * * *